(12) United States Patent
Matsumoto et al.

(10) Patent No.: US 10,070,420 B2
(45) Date of Patent: Sep. 4, 2018

(54) MOBILE COMMUNICATION SYSTEM AND USER TERMINAL

(71) Applicant: KYOCERA CORPORATION, Kyoto (JP)

(72) Inventors: Naohisa Matsumoto, Kawasaki (JP); Kugo Morita, Yokohama (JP)

(73) Assignee: KYOCERA Corporation, Kyoto (JP)

(*) Notice: Subject to any disclaimer, the term of this patent is extended or adjusted under 35 U.S.C. 154(b) by 118 days.

(21) Appl. No.: 15/220,434

(22) Filed: Jul. 27, 2016

(65) Prior Publication Data

US 2016/0338016 A1 Nov. 17, 2016

Related U.S. Application Data

(63) Continuation of application No. PCT/JP2015/052418, filed on Jan. 29, 2015.

(Continued)

(51) Int. Cl.
*H04W 72/04* (2009.01)
*H04W 76/14* (2018.01)
(Continued)

(52) U.S. Cl.
CPC ......... *H04W 72/0406* (2013.01); *H04W 4/22* (2013.01); *H04W 4/90* (2018.02);
(Continued)

(58) Field of Classification Search
CPC . H04W 72/0406; H04W 72/02; H04W 72/10; H04W 72/1278; H04W 48/18; H04W 72/048
See application file for complete search history.

(56) References Cited

U.S. PATENT DOCUMENTS

2014/0334392 A1* 11/2014 Gage .................. H04L 5/0092
370/329
2015/0043429 A1* 2/2015 Kim .................. H04W 4/008
370/328

(Continued)

FOREIGN PATENT DOCUMENTS

WO 2013/133576 A1 9/2013
WO 2013/191518 A1 12/2013

OTHER PUBLICATIONS

Extended European Search Report issued by the European Patent Office dated Aug. 31, 2017, which corresponds to EP15743781.5-1870 and is related to U.S. Appl. No. 15/220,434.

(Continued)

*Primary Examiner* — Raj Jain
(74) *Attorney, Agent, or Firm* — Studebaker & Brackett PC

(57) ABSTRACT

A mobile communication system according to the present invention is a mobile communication system that supports a D2D (Device-to-Device) proximity service in which direct communication not passing through a network is enabled, and comprises: a first user terminal configured to transmit notification information for notifying presence of first D2D communication data scheduled to be directly transmitted to another user terminal. The first user terminal is further configured to transmit, after transmitting the notification information, control information indicating a location of a data resource used for transmitting the first D2D communication data.

12 Claims, 13 Drawing Sheets

Related U.S. Application Data

(60) Provisional application No. 61/934,323, filed on Jan. 31, 2014.

(51) Int. Cl.

| | |
|---|---|
| *H04W 4/90* | (2018.01) |
| *H04W 74/08* | (2009.01) |
| *H04W 4/22* | (2009.01) |
| *H04W 76/02* | (2009.01) |
| *H04W 28/04* | (2009.01) |
| *H04W 72/02* | (2009.01) |
| *H04W 8/00* | (2009.01) |

(52) U.S. Cl.
CPC ......... *H04W 28/044* (2013.01); *H04W 72/02* (2013.01); *H04W 72/042* (2013.01); *H04W 72/044* (2013.01); *H04W 72/048* (2013.01); *H04W 74/085* (2013.01); *H04W 76/023* (2013.01); *H04W 76/14* (2018.02); *H04W 8/005* (2013.01)

(56) References Cited

U.S. PATENT DOCUMENTS

| | | | |
|---|---|---|---|
| 2015/0045078 A1* | 2/2015 | Lee | H04W 76/021 455/509 |
| 2015/0049694 A1 | 2/2015 | Choi et al. | |
| 2015/0110038 A1 | 4/2015 | Yang et al. | |
| 2015/0127733 A1* | 5/2015 | Ding | H04W 4/08 709/204 |
| 2016/0338016 A1* | 11/2016 | Matsumoto | H04W 76/023 |
| 2017/0013596 A1* | 1/2017 | van Phan | H04W 72/02 |

OTHER PUBLICATIONS

International Search Report issued in PCT/JP2015/052418; dated Apr. 28, 2015.

Written Opinion issued in PCT/JP2015/052418; dated Apr. 28, 2015.

3rd Generation Partnership Project; Technical Specification Group RAN; Study on LTE Device to Device Proximity Services-Radio Aspects; 3GPP TR 36.843 V1.0.0; Nov. 2013; pp. 1-32; Release 12; 3GPP Organizational Partners.

ETRI; Unicast, groupcast/broadcast, and relay for public safety D2D communications; 3GPP TSG-RAN1 Meeting #74; R1-133181; Aug. 19-23, 2013; Barcelona, Spain.

\* cited by examiner

FIG. 9

| LEVEL OF EMERGENCY | CONTENT | DATA TO BE EXPECTED |
|---|---|---|
| 0 | NORMAL (NO EMERGENCY) | |
| 1 | ATTENTION | ATTENTION CONTENT, ATTENTION AREA INFORMATION |
| 2 | NEED ASSISTANCE | LOCATION INFORMATION OF USER WHO NEEDS ASSISTANCE |
| 3 | EVACUATE | EVACUATION ROUTE |

… (US 10,070,420 B2)

MOBILE COMMUNICATION SYSTEM AND USER TERMINAL

TECHNICAL FIELD

The prevent invention relates to a mobile communication system that supports D2D communication, and a user terminal thereof.

BACKGROUND ART

In 3GPP (3rd Generation Partnership Project) which is a project aiming to standardize a mobile communication system, the introduction of Device to Device (D2D) proximity service is discussed as a new function after Release 12 (see Non Patent Document 1).

The D2D proximity service (D2D ProSe) is a service in which direct communication is enabled without passing through a network within a synchronization cluster formed by a plurality of synchronized user terminals. The D2D proximity service includes a discovery process (Discovery) in which a proximal terminal is discovered and a communication process (Communication) in which direct communication is performed.

PRIOR ART DOCUMENT

Non-Patent Document

Non Patent Document 1: 3GPP technical report "TR 36.843 V1.0.0" Jan. 16, 2014

SUMMARY OF THE INVENTION

Meanwhile, when a user terminal decides a time-frequency resource (hereinafter, referred to as a data resource, where appropriate) used for transmitting D2D communication data, it may be considered that in order to inform peripheral user terminals of the decided data resource, the user terminal transmits control information indicating a location of the decided data resource.

Here, it is assumed that the user terminal randomly selects a time-frequency resource for transmitting control information. In this case, when the user terminal and another user terminal select the same time-frequency resource, it is probable that control information transmitted by the user terminal and control information transmitted by the other user terminal collide with each other. As a result, it may not be possible to receive the control information.

Therefore, an object of the present invention is to provide a mobile communication system and a user terminal with which it is possible to reduce a collision of control information.

A mobile communication system according to one embodiment is a mobile communication system that supports a D2D (Device-to-Device) proximity service in which direct communication not passing through a network is enabled, and comprises: a first user terminal configured to transmit notification information for notifying presence of first D2D communication data scheduled to be directly transmitted to another user terminal. The user terminal is further configured to transmit, after transmitting the notification information, control information indicating a location of a data resource used for transmitting the first D2D communication data.

BRIEF DESCRIPTION OF THE DRAWINGS

FIG. 9 is a diagram for illustrating emergency information.

DESCRIPTION OF THE EMBODIMENT

Figure 1:
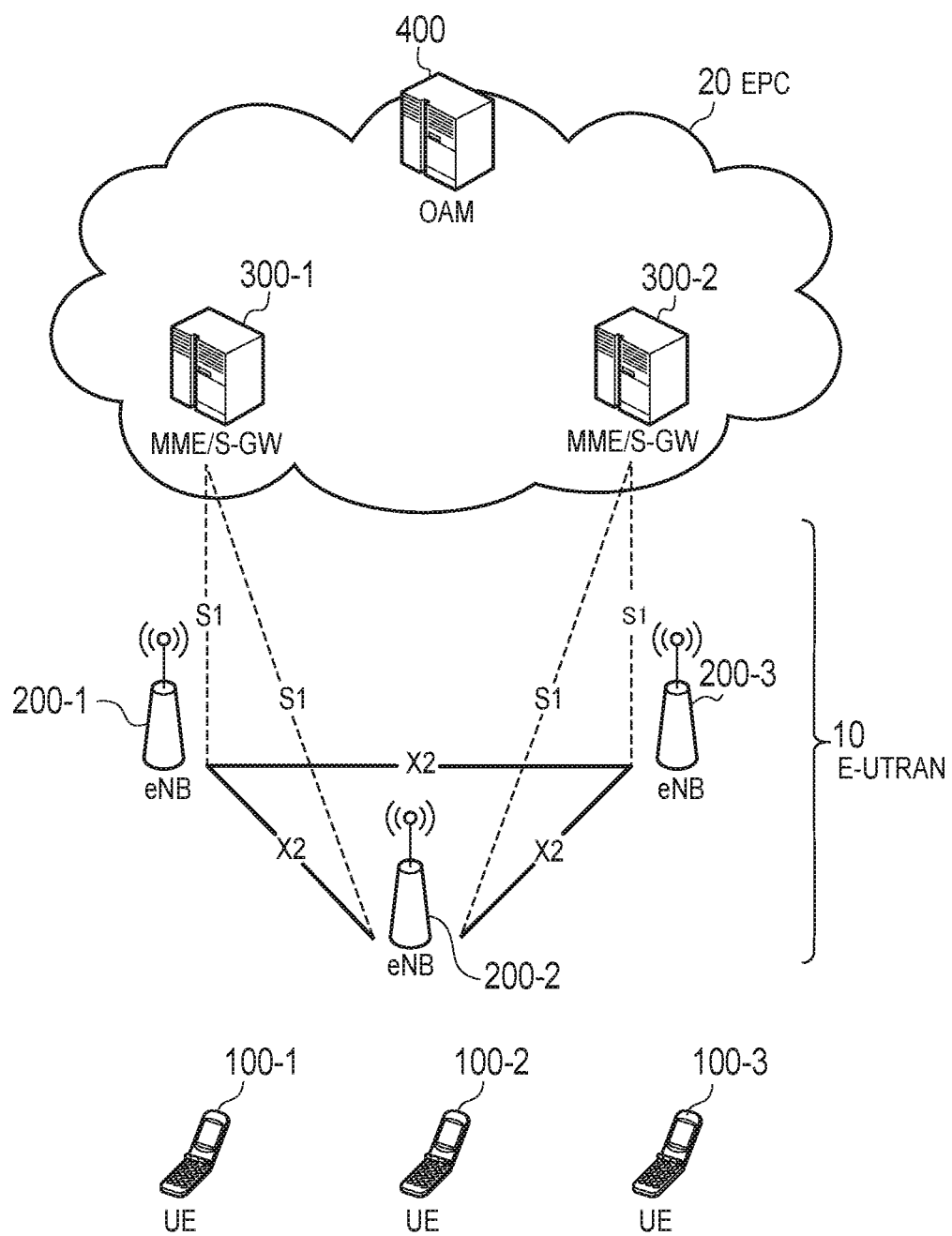
FIG. 1 is a configuration diagram of an LTE system.

A mobile communication system according to the embodiments is a mobile communication system that supports a D2D proximity service in which direct communication not passing through a network is enabled, and comprises: a user terminal configured to transmit notification information for notifying presence of D2D communication data scheduled to be transmitted, wherein the user terminal preferentially transmits, after transmitting the notification information, control information indicating a location of a data resource used for transmitting the D2D communication data.

The mobile communication system according to the first embodiment further comprises: another user terminal configured to hold D2D communication data scheduled to be transmitted, wherein the notification information is emergency information indicating that a content of the D2D communication data scheduled to be transmitted is a content of emergency, and when the emergency information is received, the another user terminal cancels transmission of the control information.

In the first embodiment, when the content of the D2D communication data scheduled to be transmitted held by the another user terminal is a content of emergency, the another user terminal transmits the control information without canceling the transmission of the control information.

In the first embodiment, the emergency information includes information indicating a level of emergency of the D2D communication data scheduled to be transmitted, and the another user terminal cancels the transmission of the control information when a level of emergency of the D2D communication data scheduled to be transmitted held by the another user terminal is lower than a level of emergency indicated by the information included in the emergency information.

In the first embodiment, a dedicated time-frequency resource used for transmitting the emergency information is periodically provided in a time axis direction, and the another user terminal receives the emergency information, and thereafter, when the emergency information is not received by the dedicated time-frequency resource in a next cycle, restarts the transmission of the control information.

In the first embodiment, the emergency information includes information indicating a level of emergency of the D2D communication data scheduled to be transmitted, and the another user terminal preferentially displays on a user interface the D2D communication data having a high level of emergency.

The mobile communication system according to the second embodiment further comprises: another user terminal configured to transmit the control information before the user terminal, wherein the another user terminal selects a transmission terminal that transmits the control information next, on a basis of the notification information, and only when the user terminal is selected as the transmission terminal, the user terminal transmits the control information.

In the second embodiment, the user terminal transmits the notification information by use of a dedicated time-frequency resource for transmitting the notification information, and the another user terminal receives the notification information by a scan of an area in which the dedicated time-frequency resource is provided.

In the second embodiment, the another user terminal transmits, together with the control information, information for designating a location of the dedicated time-frequency resource for transmitting the notification information.

In the second embodiment, the another user terminal transmits the terminal information by use of a dedicated time-frequency resource for transmitting transmission terminal information indicating the selected transmission terminal, and the user terminal receives the notification information by a scan of an area in which the dedicated time-frequency resource is provided.

In the second embodiment, the another user terminal transmits, together with the control information, information for designating a location of the dedicated time-frequency resource for transmitting the transmission terminal information.

A user terminal according to the embodiments is a user terminal configured to be used in a mobile communication system that supports a D2D proximity service in which direct communication not passing through a network is enabled, and comprises: a control unit configured to transmit notification information for notifying presence of D2D communication data scheduled to be transmitted; and the control unit preferentially transmits, after transmitting the notification information, control information indicating a location of a data resource used for transmitting the D2D communication data.

A user terminal according to a first user terminal is a user terminal configured to be used in a mobile communication system that supports a D2D proximity service in which direct communication not passing through a network is enabled. The user terminal comprises: a controller configured to receive, from an another terminal, notification information for notifying presence of D2D communication data scheduled to be transmitted. The controller cancels transmission of control information when the notification information is emergency information, the control information indicating a location of a data resource to be used for transmitting the D2D communication data. The emergency information is information indicating that a content of the D2D communication data scheduled to be transmitted is a content of emergency.

Embodiment

Hereinafter, the embodiment in a case where the present invention is applied to a LTE system will be described.
(System Configuration)

FIG. 1 is a configuration diagram of the LTE system according to a present embodiment.

As shown in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 manages a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes MME (Mobility Management Entity)/S-GW (Serving-Gateway) 300 and OAM (Operation and Maintenance) 400. Further, the EPC 20 corresponds to a core network.

The MME is a network node that performs various mobility controls and the like, for the UE 100 and corresponds to a controller. The S-GW is a network node that performs control to transfer user data and corresponds to a mobile switching center.

The OAM 400 is a server device managed by an operator and performs maintenance and monitoring of the E-UTRAN 10.

Next, configurations of the UE 100 and the eNB 200 will be described.

Figure 2:
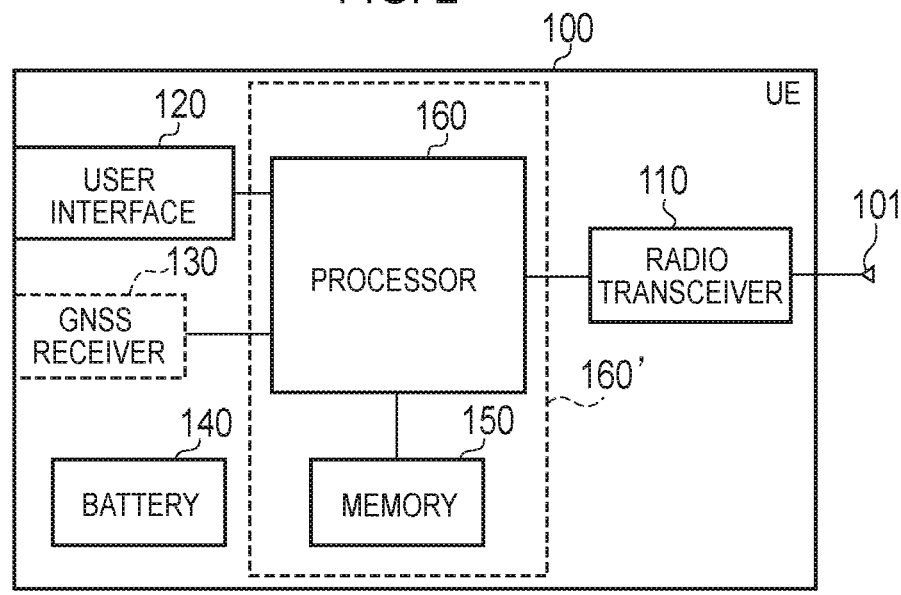
FIG. 2 is a block diagram of UE.

FIG. 2 is a block diagram of the UE 100. As shown in FIG. 2, the UE 100 includes an antenna 101, a radio transceiver 110, a user interface 120, GNSS (Global Navigation Satellite System) receiver 130, a battery 140, a memory 150, and a processor 160. The memory 150 and the processor 160 configure a control unit.

The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
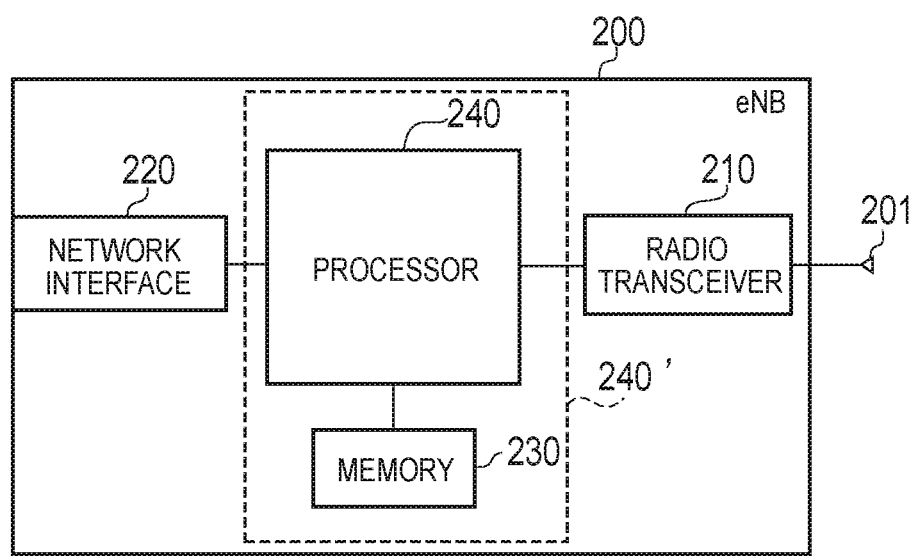
FIG. 3 is a block diagram of eNB.

FIG. 3 is a block diagram of the eNB 200. As shown in FIG. 3, the eNB 200 includes an antenna 201, a radio transceiver 210, a network interface 220, a memory 230, and a processor 240. The memory 230 and the processor 240 constitute a control unit. In addition, the memory 230 is integrated with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
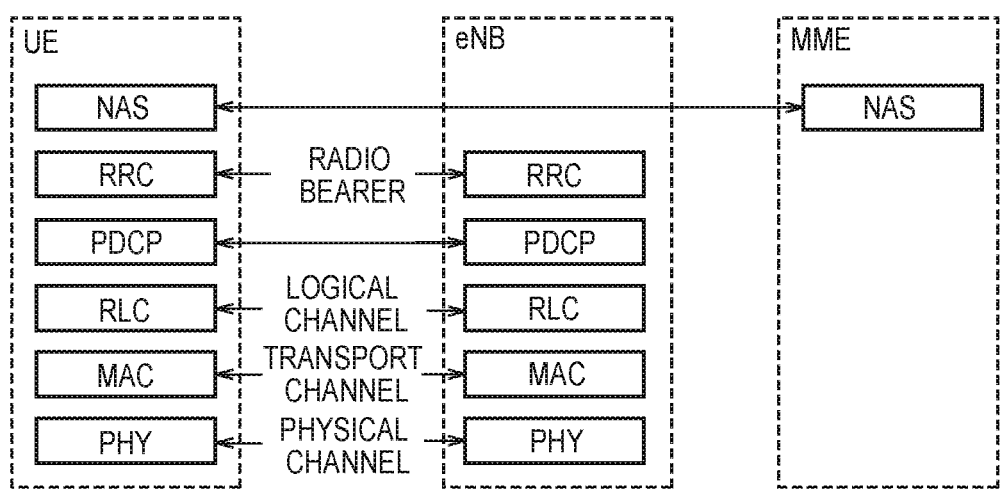
FIG. 4 is a protocol stack diagram of a radio interface in an LTE system.

FIG. 4 is a protocol stack diagram of a radio interface in the LTE system.

As shown in FIG. 4, the radio interface protocol is classified into a layer 1 to a layer 3 of an OSI reference model, wherein the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a MAC scheduler to decide a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

NAS (Non-Access Stratum) layer positioned above the RRC layer performs session management, mobility management and the like.

Figure 5:
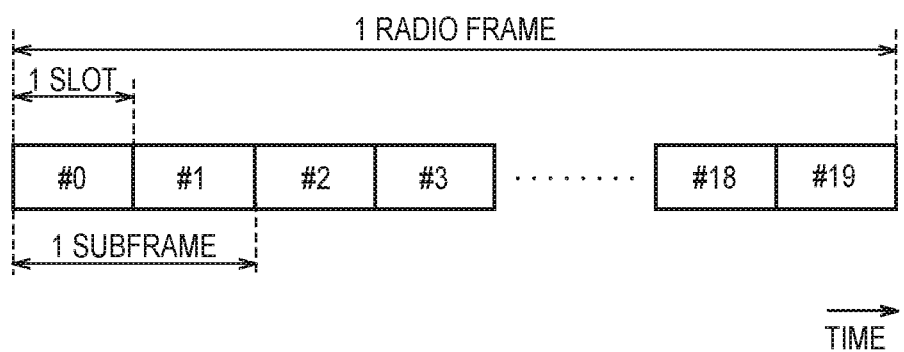
FIG. 5 is a configuration diagram of a radio frame used in an LTE system.

FIG. 5 is a configuration diagram of a radio frame used in the LTE system. In the LTE system, OFDMA (Orthogonal Frequency Division Multiple Access) is employed in a downlink, and SC-FDMA (Single Carrier Frequency Division Multiple Access) is employed in an uplink, respectively.

As shown in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region that can be mainly used as a physical uplink shared channel (PUSCH). Moreover, in each subframe, a demodulation reference signal (DMRS) and a sounding reference signal (SRS) are arranged.

(D2D Communication)

Next, description will be provided by comparing the D2D communication with the normal communication (the cellular communication) in the LTE system.

Figure 6:
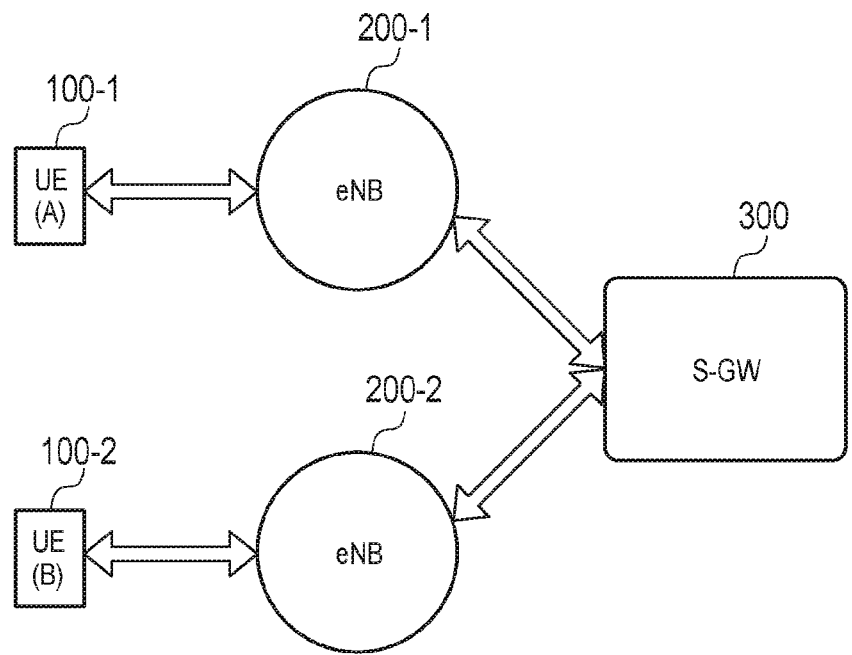
FIG. 6 is a diagram illustrating a data path in cellular communication.

FIG. 6 is a diagram illustrating a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

Figure 7:
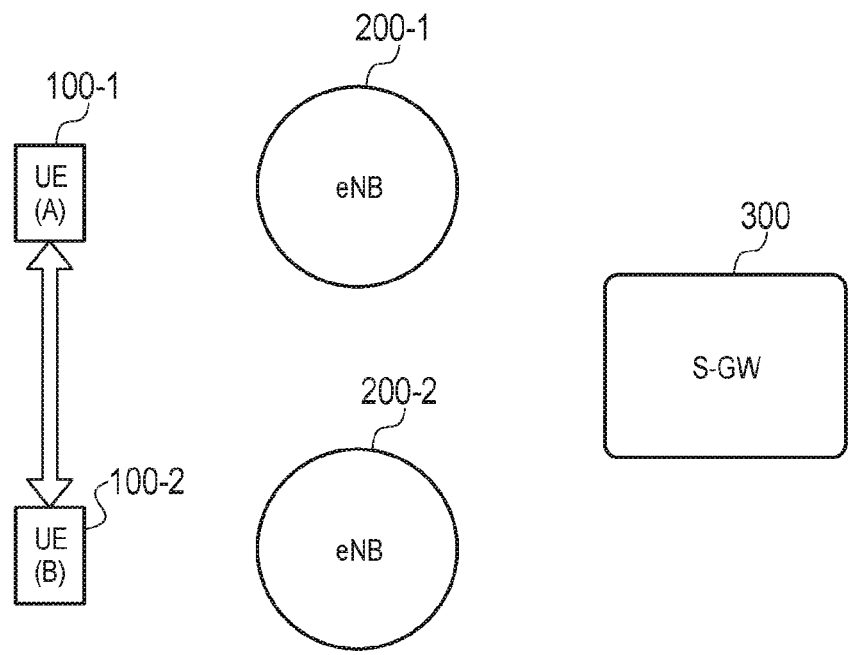
FIG. 7 is a diagram illustrating a data path in D2D communication.

FIG. 7 is a diagram illustrating a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not pass through the network. That is, direct radio communication is performed between UEs. As described above, when the UE 100-2 exists in the vicinity of the UE 100-1, the D2D communication is performed between the UE 100-1 and the UE 100-2, thereby obtaining an effect that a traffic load on the network and a battery consumption amount of the UE 100 are reduced, for example.

It is noted that cases in which the D2D communication is started include (a) a case in which the D2D communication is started after a proximal terminal is discovered by performing an operation for discovering a proximal terminal, and (b) a case in which the D2D communication is started without performing an operation for discovering a proximal terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximal terminal, the UE 100 has a (Discover) function of discovering another UE 100 existing in the proximity of the UE 100, and/or a (Discoverable) function of being discovered by another UE 100.

Specifically, the UE 100-1 transmits a discovery signal (Discovery signal/Discoverable signal) that is used to either discover a proximal terminal or to be discovered by a proximal terminal. The UE 100-2 that receives the discovery signal discovers the UE 100-1. When the UE 100-2 transmits a response to the discovery signal, the UE 100-1 that has transmitted the discovery signal discovers the UE 100-2, which is the proximal terminal.

It is noted that the UE 100 need not necessarily perform the D2D communication even upon discovering a proximal terminal, for example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts. It is noted that when the UE 100-1 does not perform the D2D communication after discovering a proximal terminal, the UE 100-1 may report, to an upper layer (for example, an application), the discovery of the proximal UE 100 (that is, the UE 100-2). For example, the application is capable of executing a process based on the report (for example, a process of plotting the position of the UE 100-2 in the geographical information).

Moreover, the UE 100 is capable of reporting the discovery of a proximal terminal to the eNB 200, and is also capable of receiving, from the eNB 200, an instruction regarding whether to communicate with the proximal terminal through the cellular communication or through the D2D communication.

On the other hand, in the above-described case (b), for example, the UE 100-1 starts the transmission (such as a notification through broadcasting) of a signal for the D2D communication without specifying a proximal terminal. Thus, the UE 100 is capable of starting the D2D communication regardless of the existence of the discovery of a proximal terminal. It is noted that the UE 100-2 that is performing the standby operation for the signal for the D2D communication performs synchronization or/and demodulation on the basis of the signal from the UE 100-1.

(Decision of Control Resource and Data Resource)

Figure 8:
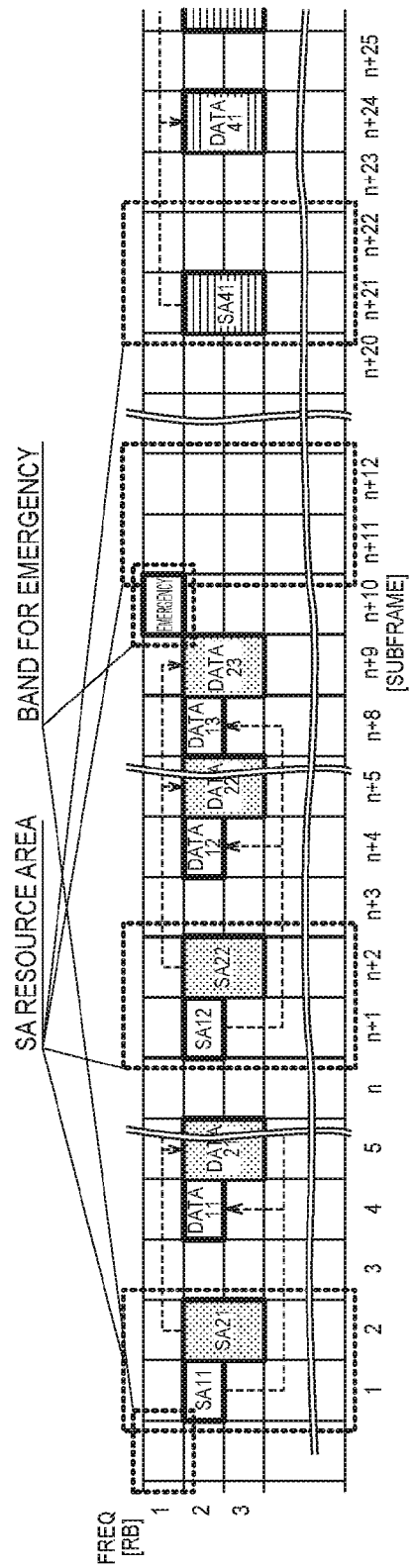
FIG. 8 is a configuration diagram of a radio frame for illustrating a mobile communication system according to an embodiment.

Next, an operation, in which a UE 100-1 decides a control resource and a data resource, will be described with reference to FIG. 8. FIG. 8 is a configuration diagram of a radio frame for illustrating a mobile communication system according to a first embodiment.

The UE 100-1 decides a data resource, which is a time-frequency resource used for transmitting D2D communication data, from among time-frequency resources available for a D2D proximity service. Furthermore, the UE 100-1 decides a control resource (SA resource), which is a time-frequency resource used for transmitting control information (SA: Scheduling Assignment) representing a location of the data resource, from among the time-frequency resources available for the D2D proximity service.

In the present embodiment, the UE 100-1 decides the SA resource from a control resource area (SA resource area) limited in range in the time-frequency resources available for the D2D proximity service. The SA resource area is an area in which SA resources permitted to be used by the UE 100 to transmit SA are arranged. In the present embodiment, the SA resource area is periodically provided in a time axis direction.

When the UE 100-1 camps on a cell managed by the eNB 200, the UE 100-1 decides the SA resources on the basis of control resource information (SA resource information) received from the eNB 200 (the cell).

The SA resource information is information for designating an SA resource area, an SA resource, or a candidate of the SA resource area. For example, the SA resource information includes information indicating at least any one of a frequency band and/or a time zone of the SA resource area, an offset (a time and/or a frequency), and a cycle (a time).

The offset, for example, is expressed using the following Equation.

$$(\text{offset}) = (SFN \times 10 + \text{subframe}) \bmod (\text{cycle})$$

Furthermore, the SA resource information may include information indicating at least one of a size of one SA resource, the number of SA resources assignable by the UE 100 (and/or the presence or absence of the SA resource), and a modulation and coding scheme (MCS) which is applied to the SA.

Furthermore, when the UE 100-1 does not camp on a cell managed by the eNB 200 (when the UE 100-1 is located out of coverage), the UE 100-1 decides the SA resources on the basis of configuration information previously stored in the UE 100-1. The configuration information is similar to the above-mentioned SA resource information.

In FIG. 8, the UE 100-1 decides a resource at a location of (subframe 1, RB2) as an SA resource from the SA resource area having a limited range.

Furthermore, the UE 100-1 decides the data resource from among the time-frequency resources available for the D2D proximity service.

When a data resource area, which is an area where data resources permitted to be used by the UE 100 to transmit D2D communication data are arranged, is designated, the UE 100-1 decides a data resource from a data resource area having a limited range. For example, in FIG. 8, the UE 100-1 decides resources at a location of (subframe 4, RBs 2 and 3) and the like as data resources.

Next, the UE 100-1 uses the decided SA resource to transmit SA11 indicating the location of the decided data resource. The SA11 allows the UE 100-2 that receives the SA11 to grasp the locations of data resources, which are used by the UE 100-1 to transmit D2D communication data. Furthermore, the UE 100-1 uses the data resources indicated by the SA11 to transmit D2D communication data (DATA 11 and the like). The UE 100-2 receives the D2D communication data from the UE 100-1 by a scan of the grasped data resources.

(D2D Communication for Emergency)

Figure 10:
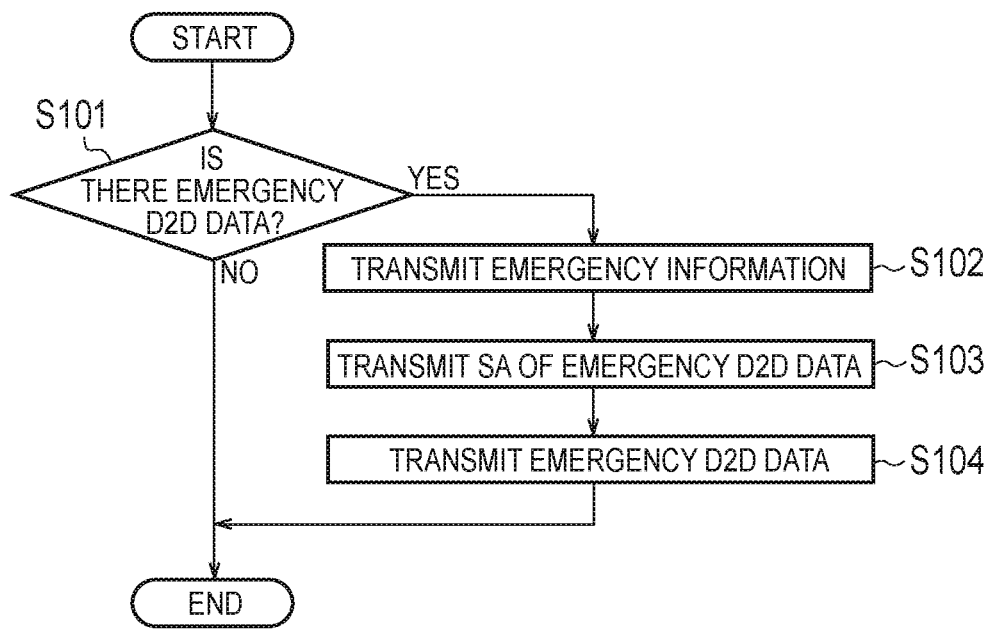
FIG. 10 is a flowchart for illustrating an operation of a UE 100 according to a first embodiment.
Figure 11:
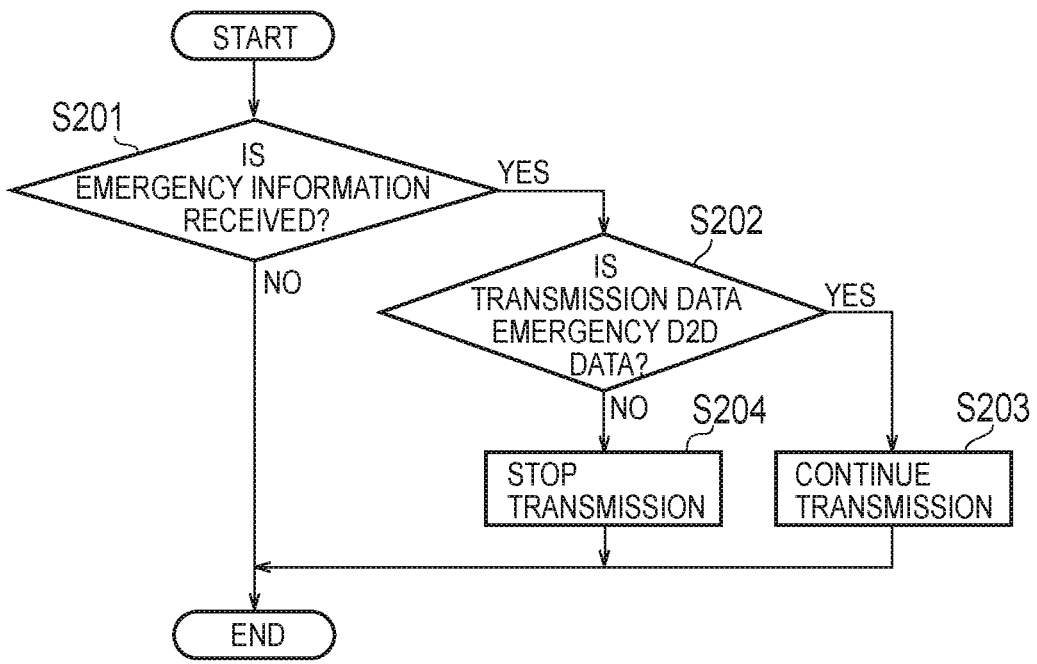
FIG. 11 is a flowchart for illustrating an operation of the UE 100 according to the first embodiment.

Next, a case, in which the UE 100 transmits a content of emergency by D2D communication, will be described with reference to FIG. 8 to FIG. 11. FIG. 9 is a diagram for illustrating emergency information. FIG. 10 is a flowchart for illustrating an operation of the UE 100 according to the first embodiment. FIG. 11 is a flowchart for illustrating the operation of the UE 100 according to the first embodiment.

(A) Overview

When the content of D2D communication data scheduled to be transmitted is a content of emergency, the UE 100 uses a resource for emergency to transmit emergency information.

The content of emergency, for example, is a content about an attention, a content about an assistance request, and a content about an evacuation. Specifically, the content about an attention is an attention content, attention area information and the like. The content about an assistance request is location information and the like of a user (UE) requesting assistance. The content about an evacuation is an evacuation route and the like.

For example, when D2D communication is designated as an emergent content by a user, the UE 100 determines to transmit the content of the emergency by the D2D communication.

The emergency information is notification information indicating the presence of the D2D communication data scheduled to be transmitted, and in the present embodiment, indicates that the content of the D2D communication data scheduled to be transmitted is the content of emergency.

The emergency information may include information indicating a level of emergency of the D2D communication data scheduled to be transmitted. For example, as illustrated in FIG. 9, the level of emergency of the content about an attention is set to "1", that of the content about an assistance request is set to "2", and that of the content about an evacuation is set to "3". It is noted that a normal level of emergency may be set to "0".

The resource for emergency (a band for emergency) is a dedicated time-frequency resource for transmitting the emergency information. The resource for emergency is periodically provided in a time axis direction. For example, the resource for emergency may be provided at a cycle longer than that of an SA resource area, and specifically, may also be provided at a cycle of 1 degree in 1024 [subframes].

Another UE 100 always searches for the resource for emergency, and recognizes an emergency state when emergency information transmitted by using the resource for emergency is received. It is noted that, when a plurality of UEs use the same resource for emergency to transmit the content of emergency information, emergency information may collide. Even though it is not possible to read the content of the emergency information, when a collision of the emergency information is detected, the other UE 100 recognizes an emergency state. For example, when the other UE 100 searches for (monitors) the resource for emergency to detect received power and is not able to read the content of the emergency information, the other UE 100 recognizes the emergency state.

In a case of the emergency state, the UE 100 is prohibited from transmitting D2D communication data other than the content of emergency. In this way, the UE 100 transmits emergency information and thereafter, uses an SA resource to preferentially transmit the SA indicating the location of a data resource used for transmitting the D2D communication data of the content of emergency. Thereafter, the UE 100 uses the data resource indicated by the SA to transmit the D2D communication data of the content of the emergency.

The UE 100 may monitor an SA resource and a data resource immediately after the transmission of the emergency information, and may transmit the SA after confirming a use state of the SA resource and the data resource. When the SA resource immediately after the transmission of the emergency information is used, the UE 100 decides an SA resource on the basis of SA resource information or configuration information.

The emergency state is valid for a constant period, and for example, is valid for one cycle of the resource for emergency. The UE 100 that transmits the emergency information may transmit information indicating a normal level of emergency by using the SA resource or the data resource, thereby ending the emergency state.

When the emergency information is received, the other UE 100 monitors the SA resource area and receives the D2D communication data of the content of the emergency. When information indicating a level of emergency is included in the SA and/or the D2D communication data, the UE 100 is capable of grasping the level of emergency of the D2D communication data. Alternatively, when the emergency information including the information indicating the level of emergency and the SA and/or the D2D communication data are associated with each other by a UE identifier and the like, the UE 100 is capable of grasping the level of emergency of the D2D communication data. In this case, the UE 100 may preferentially display on a user interface D2D communication data having a high level of emergency.

(B) Operation Example

Hereinafter, with reference to FIG. 8, an operation example of each UE 100 will be described in detail.

As illustrated in FIG. 8, the UE 100-1 periodically transmits SA (SA11 and SA 12) and D2D communication data (DATA 11 to DATA 13). Furthermore, the UE 100-2 periodically transmits SA (SA 21 and SA 22) and D2D communication data (DATA 21 to DATA 23). Each of the UE 100-1 and the UE 100-2 transmits D2D communication data up to a cycle to which n+9 [subframe] belongs.

Each of the UE 100-1 and the UE 100-2 is scheduled to transmit the D2D communication data also in a next cycle, and decides an SA resource and a data resource similarly to a previous cycle.

On the other hand, the UE 100-3 is scheduled to transmit D2D communication data of the content of emergency, and uses the resource for emergency to transmit the emergency information by broadcast. Specifically, the UE 100 transmits the emergency information (Emergency) by using the resource for emergency at a location of (subframe (n+10), RB1).

Each of the UE 100-1 and the UE 100-2 monitors the resource for emergency and receives the emergency information. Each of the UE 100-1 and the UE 100-2 that receives the emergency information recognizes an emergency state. Since D2D communication data scheduled to be transmitted does not include the content of emergency, each of the UE 100-1 and the UE 100-2 stops D2D communication scheduled to be transmitted. Specifically, each of the UE 100-1 and the UE 100-2 cancels SA transmission scheduled to be transmitted. In this way, in an SA resource area of n+11 and n+12 [subframes], no SA is transmitted. Furthermore, since no SA indicating the location of a data resource is transmitted, each of the UE 100-1 and the UE 100-2 also cancels the transmission of D2D communication data.

It is noted that, when the D2D communication data scheduled to be transmitted includes the content of emergency, at least one of the UE 100-1 and the UE 100-2 uses an SA resource in an SA resource area of a cycle immediately after the transmission of the emergency information to transmit SA indicating the location of the D2D communication data of the content of emergency.

On the other hand, the UE 100-3 monitors the SA resource area and an area (n+11 to n+20 [subframes]) in which D2D communication data is arranged. As a result of the monitoring, the UE 100-3 determines that another UE 100 transmits no D2D communication data, and uses SA resources in the SA resource area to transmit SA 41 indicating the D2D communication data (DATA 41 and the like) of the content of emergency. Thereafter, the UE 10 uses data resources indicated by SA to transmit the DATA 41 and the like.

It is noted that, when the other UE 100 transmits SA by using the SA resources in the SA resource area immediately after the transmission of the emergency information, the UE 100-3 decides an SA resource on the basis of SA resource information or configuration information so that the SA of the UE 100-3 and the SA of the other UE 100 do not collide with each other.

For example, when the location of SA in a next cycle is limited to the location equal to that of SA in a previous cycle, the UE 100-3 estimates the location of SA in a next cycle of the other UE 100 on the basis of the SA resource information, and decides the SA resource.

Thereafter, each of the UE 100-1 and the UE 100-2 restarts D2D communication after the emergency state is released. Specifically, each of the UE 100-1 and the UE 100-2 monitors the resource of emergency, and when the emergency information is not received, the SA resource and the data resource are decided and the transmission of the SA and the D2D communication data is restarted.

(C) Operation Flow of UE 100 that Transmits Emergency Information

Next, an operation flow of the UE 100 that transmits emergency information will be described with reference to FIG. 10.

In step S101, the UE 100 determines whether D2D communication data (emergency D2D data) of the content of emergency exists in D2D communication data scheduled to be transmitted. When there is the emergency D2D data, the UE 100 executes the process of step S102. On the other hand, when there is no emergency D2D data, the UE 100 ends the process.

In step S102, the UE 100 uses the resource for emergency to transmit the emergency information by broadcast. Furthermore, the UE 100 decides a data resource to be used for transmitting the emergency D2D data and the location of an SA resource indicating the location of the data resource.

In step S103, the UE 100 uses the decided SA resource to transmit SA. In step S104, the UE 100 uses the data resource indicated by the decided SA to transmit the emergency D2D data.

(D) Operation Flow of UE 100 that Receives Emergency Information

Next, an operation flow of the UE 100 that receives emergency information will be described with reference to FIG. 11.

Hereinafter, a description will be given on the assumption that similarly to the above, the UE 100 transmits the SA and the D2D communication data.

In step S201, the UE 100 monitors the resource for emergency. As a result of the monitoring, when emergency information is received, the UE 100 executes the process of step S202. On the other hand, when the emergency information is not received, the UE 100 ends the process.

In step S202, the UE 100 determines whether D2D communication data scheduled to be transmitted held in the UE 100 itself is emergency D2D data. When the UE 100 is scheduled to transmit the emergency D2D, the UE 100 executes the process of step S203. On the other hand, when the UE 100 is scheduled to transmit the normal D2D communication data, the UE 100 executes the process of step S204.

It is noted that, even though the D2D communication data scheduled to be transmitted held in the UE 100 itself is the emergency D2D data, when the level of emergency of the emergency D2D data of the UE 100 itself is lower than that represented by information included in the emergency information, the UE 100 may execute the process of step S204 without executing the process of step S203.

In step S203, the UE 100 transmits the emergency D2D data and continues the transmission of the D2D communication data. When all emergency D2D data scheduled to be transmitted are transmitted, the UE 100 stops the transmission of D2D data until an emergency state is released.

On the other hand, in step S204, the UE 100 cancels (stops) the transmission of the SA and the D2D communication data.

It is noted that, when emergency D2D data is held by a low level of emergency, if emergency D2D data having a level of emergency higher than that of the held emergency D2D data is not transmitted, the UE 100 may start the transmission of emergency D2D data.

Summary of First Embodiment

In the present embodiment, the UE 100 preferentially transmits, after transmitting the emergency information, the SA indicating the location of the data resource used for transmitting the D2D communication data of the content of emergency. In this way, it is possible to reduce the SA of the UE 100 holding D2D communication data having a high priority colliding with another UE 100.

In the present embodiment, when the emergency information is received from the UE 100, the other UE 100 cancels the transmission of the SA. In this way, it is possible to reduce the SA of the UE 100 holding D2D communication data having a high priority colliding with another UE 100.

In the present embodiment, when the content of D2D communication data scheduled to be transmitted held by the other UE 100 is the content of emergency, the other UE 100 transmits the SA without canceling the transmission of the SA. In this way, the other UE 100 are also able to preferentially transmit the emergency D2D data.

In the present embodiment, when a level of emergency of emergency D2D data held by the other UE 100 is lower than a level of emergency indicated by information included in the emergency information, the other UE 100 cancels the transmission of the SA. In this way, it is possible to reduce the SA having a higher priority colliding with another SA having a lower priority.

In the present embodiment, when the other UE 100 receives the emergency information, and thereafter, when the emergency information is received by a resource for emergency in a next cycle, the other UE 100 restarts the transmission of the SA. In this way, another SA can grasp a normal state, and thus, it is possible to transmit the SA without a collision with SA having a high level of emergency.

In the present embodiment, the other UE 100 preferentially displays on a user interface emergency D2D data having a high level of emergency. In this way, a user is capable of sequentially grasping the information in order of a higher priority.

Second Embodiment

Next, a second embodiment will be described. It is noted that a description will be provided while focusing on a portion different from the above-described embodiment, and a description of a similar portion will be omitted.

In the above-described embodiment, the notification information is emergency information. In the present embodiment, the notification information is an SA transmission request for requesting to be a transmission UE of next SA.

(Operation According to Second Embodiment)

Figure 12:
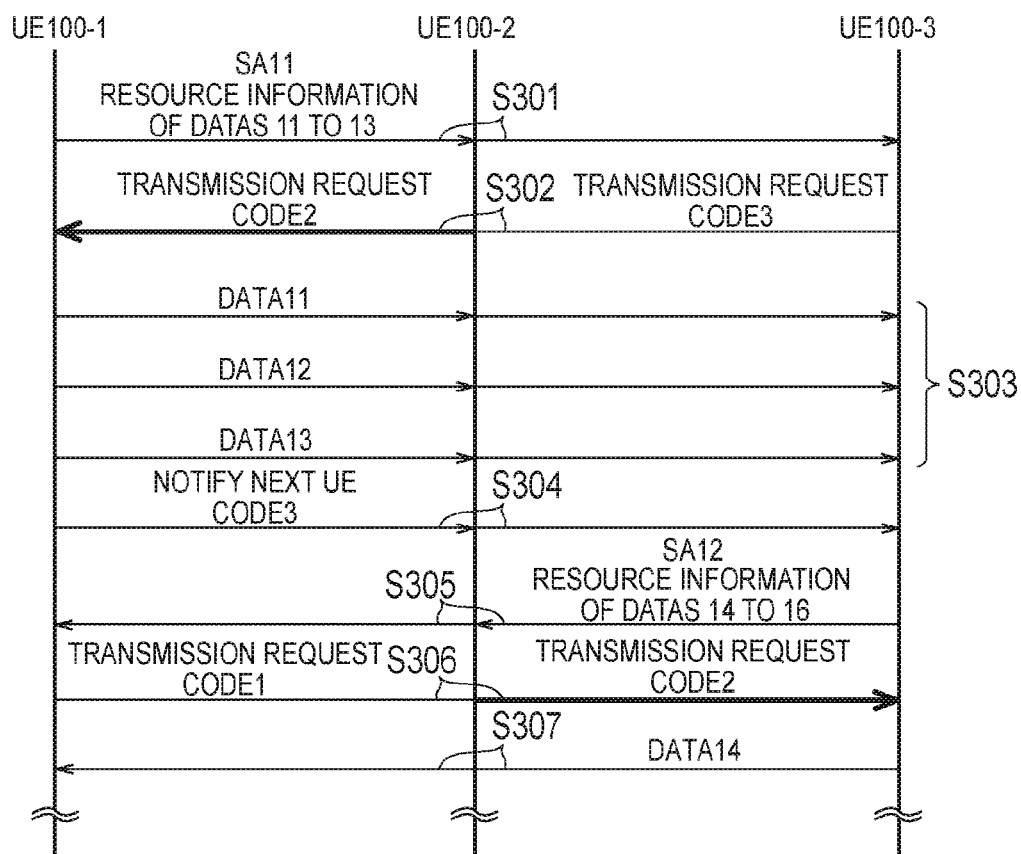
FIG. 12 is a sequence for illustrating an operation of a mobile communication system according to a second embodiment.
Figure 13:
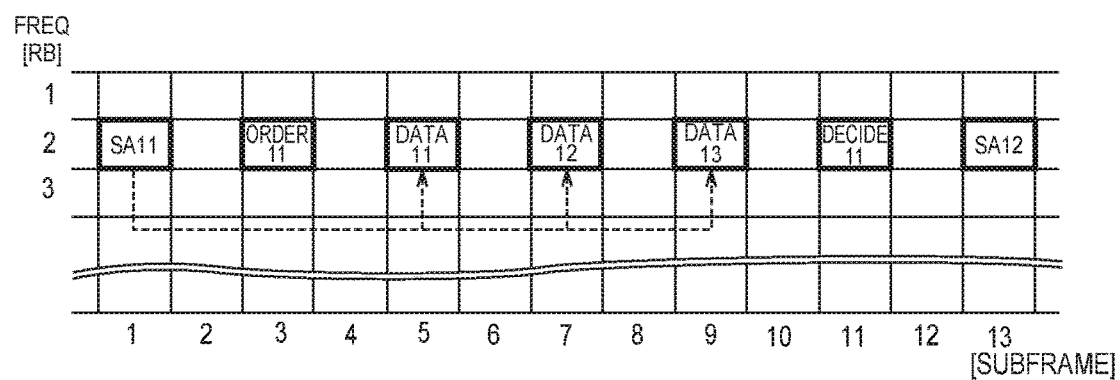
FIG. 13 is a configuration diagram of a radio frame for illustrating the mobile communication system according to the second embodiment.

An operation according to the second embodiment will be described with reference to FIG. 12 and FIG. 13. FIG. 12 is a sequence for illustrating an operation of a mobile communication system according to the second embodiment. FIG. 13 is a configuration diagram of a radio frame for illustrating the mobile communication system according to the second embodiment.

In the present embodiment, it is defined that a UE 100 transmitting SA decides a UE 100 which transmits next SA.

As illustrated in FIG. 12 and FIG. 13, in step S301, a UE 100-1 transmits SA 11 indicating the locations of data resources of DATA 11, DATA 12, and DATA 13 which are D2D communication data. Each of a UE 100-2 and a UE 100-3 receives the SA 11.

In step S302, each of the UE 100-2 and the UE 100-3 uses an SA transmission request resource to transmit an SA transmission request (Order 11). The SA transmission request indicates the presence of D2D communication data scheduled to be transmitted, and requests selection as a transmission UE which transmits SA next to the UE 100-1.

The SA transmission request resource, which is a time-frequency resource for the SA transmission request, is a dedicated time-frequency resource. The SA transmission request resource may be a prescribed time-frequency resource, and may be designated by the UE 100-1 transmitting the SA. In this case, the UE 100-1 designates a location different from a data resource as the location of the SA transmission request resource. It may be possible to use an SA resource to transmit, together with the SA 11, information for designating the location of the SA transmission request resource.

Each of the UE 100-2 and the UE 100-3 may use a UE-specific signal sequence (codes) to transmit the SA transmission request, in order to distinguish from another SA transmission request. In this way, even when the UE 100-2 and the UE 100-3 use the same time-frequency resource to transmit the SA transmission requests, the UE 100-1 is capable of acquiring the SA transmission requests of the UE 100-2 and the UE 100-3. In the present embodiment, the UE 100-2 uses the code 2 to transmit the SA transmission request, and the UE 100-3 uses the code 3 to transmit the SA transmission request.

The UE 100-1 receives the SA transmission requests by a scan of SA transmission request resources. In this way, the UE 100-1 grasps that the UE 100-2 and the UE 100-3 request the transmission of SA. Next, the UE 100-1 selects a transmission UE, which transmits SA next time, on the basis of the SA transmission requests. The UE 100-1 may randomly select the transmission UE from the UEs that transmits the SA transmission requests, or preferentially select a UE having a low transmission frequency. Hereinafter, a description will be given on the assumption that the UE 100-1 selects the UE 100-3.

In step S303, the UE 100-1 uses the data resources indicated by the SA 11 to transmit each of the DATA 11 to the DATA 13. Each of the UE 100-2 and the UE 100-3 receives the DATA 11 to the DATA 13.

In step S304, the UE 100-1 uses SA transmission notification resources to transmit SA transmission notification (Decide 11) for notifying the selected transmission UE by broadcast. Specifically, in the UE 100-1, the selected UE 100-3 transmits the SA transmission notification by using the same signal sequence (code 3) as the SA transmission request.

The SA transmission notification resource, which is a time-frequency resource for the SA transmission notification, is a dedicated time-frequency resource. The SA transmission notification resource may be a prescribed time-frequency resource, and may be designated by the UE 100-1 transmitting the SA. In this case, the UE 100-1 designates a location different from a data resource as the location of the SA transmission request resource. It may be possible to use the SA resource to transmit, together with the SA 11, information for designating the location of the SA transmission notification resource.

The UE 100-3 receives the SA transmission notification transmitted by using the same signal sequence (code 3) as the SA transmission request of the UE 100-3 by a scan of the SA transmission notification resources. In this way, the UE 100-3 recognizes that the UE 100-3 itself is the transmission UE which transmits SA next time. In order to transmit D2D communication data, the UE 100-3 decides an SA resource and a data resource.

On the other hand, the UE 100-2 receives the SA transmission notification by a scan of the SA transmission notification resources. In this way, the UE 100-2 recognizes that the UE 100-2 is not selected as the transmission UE which transmits SA next time.

In steps S305 to S307, the UE 100-3 performs operations similar to those of the UE 100-1 in steps S301 and S303. Furthermore, each of the UE 100-1 and the UE 100-2 performs an operation similar to that of the UE 100-2 (or the UE 100-3) in steps S302.

It is noted that, when the UE 100 transmitting the SA does not receive the SA transmission request, the UE 100 may select the UE 100 itself as the transmission UE which transmits SA next time. In this case, the UE 100 uses the SA transmission notification resources to notify by broadcast that the UE 100 itself is selected.

(Summary of Second Embodiment)

In the present embodiment, each of the UE 100-2 and the UE 100-3 transmits the SA transmission request. The UE 100-3 preferentially transmits, after transmitting the SA transmission request, the SA. In this way, it is possible to reduce the SA of the UE 100-3 colliding with the SAs transmitted from the UE 100-1 and the UE 100-2.

In the present embodiment, the UE 100-1 transmitting the SA selects, on the basis of the SA transmission request, the transmission UE which transmits SA next time. Only when the UE 100-3 is selected as the transmission UE, the UE 100-3 transmits the SA. In this way, it is possible to reduce the SA of the UE 100-3 colliding with the SAs transmitted from the UE 100-1 and the UE 100-2.

In the present embodiment, each of the UE 100-2 and the UE 100-3 uses the SA transmission request resources to transmit the SA transmission request. The UE 100-1 receives the SA transmission requests by the scan of SA transmission request resources. In this way, it is possible to avoid the SA transmission request colliding with another radio signal.

In the present embodiment, the UE 100-1 transmits, together with the SA, information for designating the SA transmission request resource. In this way, each of the UE 100-2 and the UE 100-3 searches for the SA resource area, thereby knowing the SA transmission request resources.

In the present embodiment, the UE 100-1 uses the SA transmission notification resources to transmit the SA transmission notification. Each of the UE 100-2 and the UE 100-3 receives the SA transmission notification by the scan of the SA transmission notification resources. In this way, it is possible to avoid the SA transmission notification colliding with another radio signal.

In the present embodiment, the UE 100-1 transmits, together with the SA, information for designating the SA transmission notification resource. In this way, each of the UE 100-2 and the UE 100-3 searches for the SA resource area, thereby knowing the location of the SA notification request resource.

Other Embodiments

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

For example, the above-described second embodiment may be applied to a D2D group including a plurality of UEs 100. The second embodiment may also be applied to a case where each of a plurality of D2D groups uses an SA resource different from that of another D2D group to perform D2D communication.

In addition, the aforementioned embodiment has described an example in which the present invention is applied to the LTE system. However, the present invention may also be applied to systems other than the LTE system, as well as the LTE system.

APPENDIX (1) Introduction

Resource allocation method with scheduling assignment (SA) for D2D communication was proposed. In this appendix, we consider D2D communication resource allocation with SA from collision avoidance perspective. In this appendix, we focus on the allocation for out of coverage. The similar scheme can be used for in-coverage case as well. However, in-coverage case is not discussed in this appendix.

(2) Design Considerations for D2D Communication Resource Allocation Using Scheduling Assignments SA assisted resource allocation provides a possibility of efficient collision avoidance. There are several advantages of SA.

Figure 14:
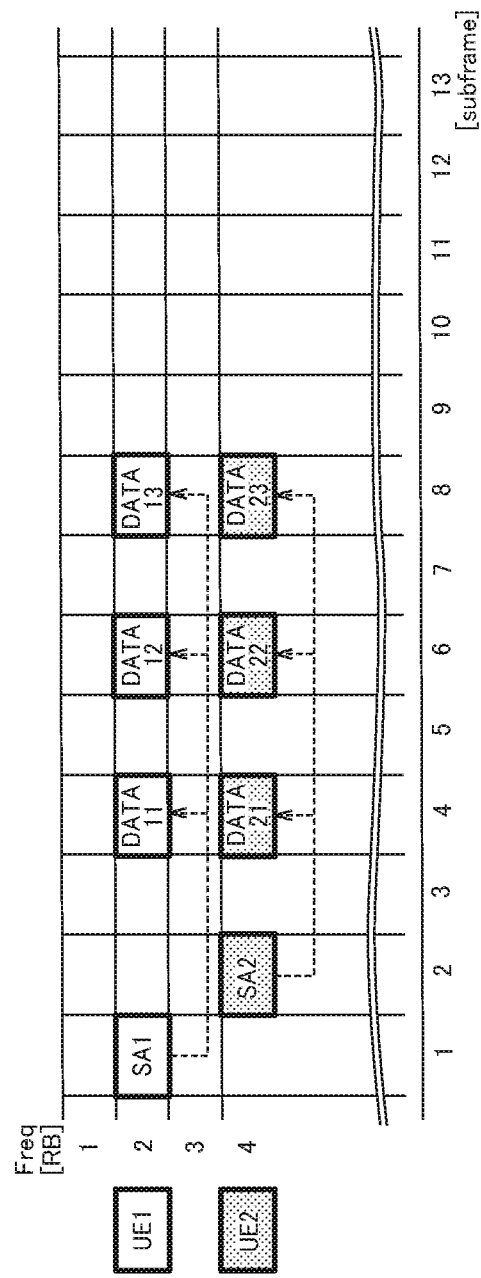
FIG. 14 is a diagram for illustrating an example usage of SA for collision avoidance of data.

As discussed, the FIG. 14 shows how UE2 may detect SA1 transmitted by UE1 and use this information to schedule its own data transmissions by avoiding those resources listed in SA1. In order to further improve the above we propose additional principles for the SA based resource allocation schemes.

Figure 15:
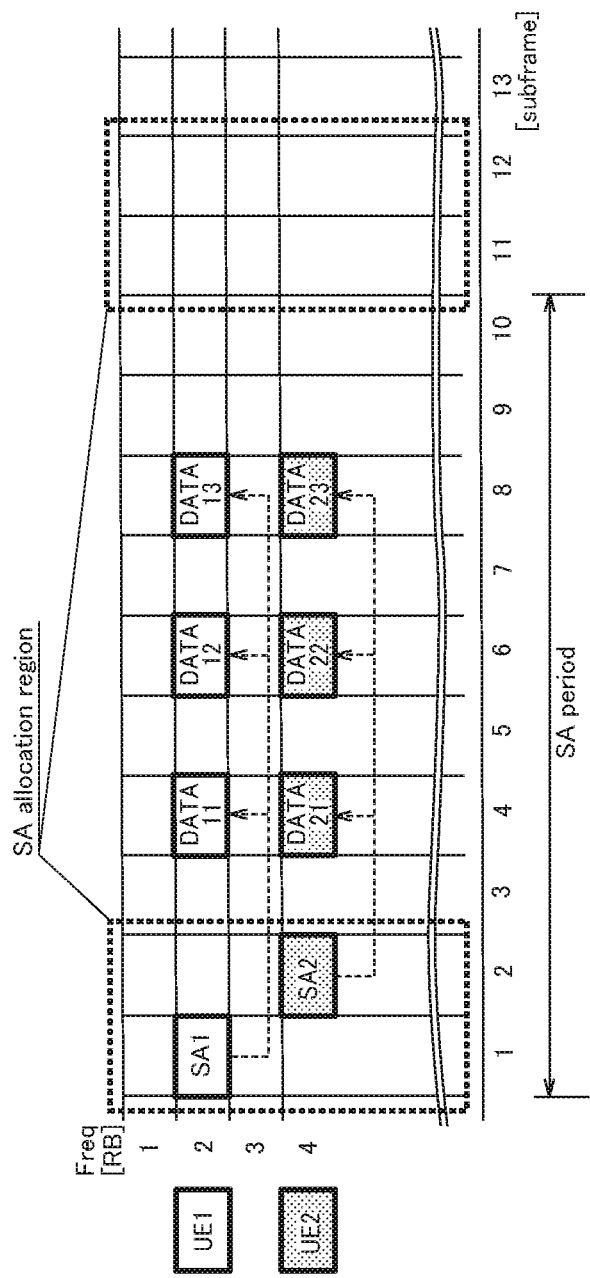
FIG. 15 is a diagram for illustrating SA period and SA regions.

(3) Design Considerations for D2D Communication Resource Allocation Rules for Out of Coverage (3.1) SA Transmissions In order to reduce receiver complexity SA transmissions are periodic and using pre-defined time-frequency resources known to the receiver. As an example, shown in the FIG. 15, the location for SA transmission resources can be grouped together within a region for simpler detection.

Proposal 1: If SA is agreed then SAs should be transmitted periodically and grouped together within a given region.

(3.2) Transmission of Data

Figure 16:
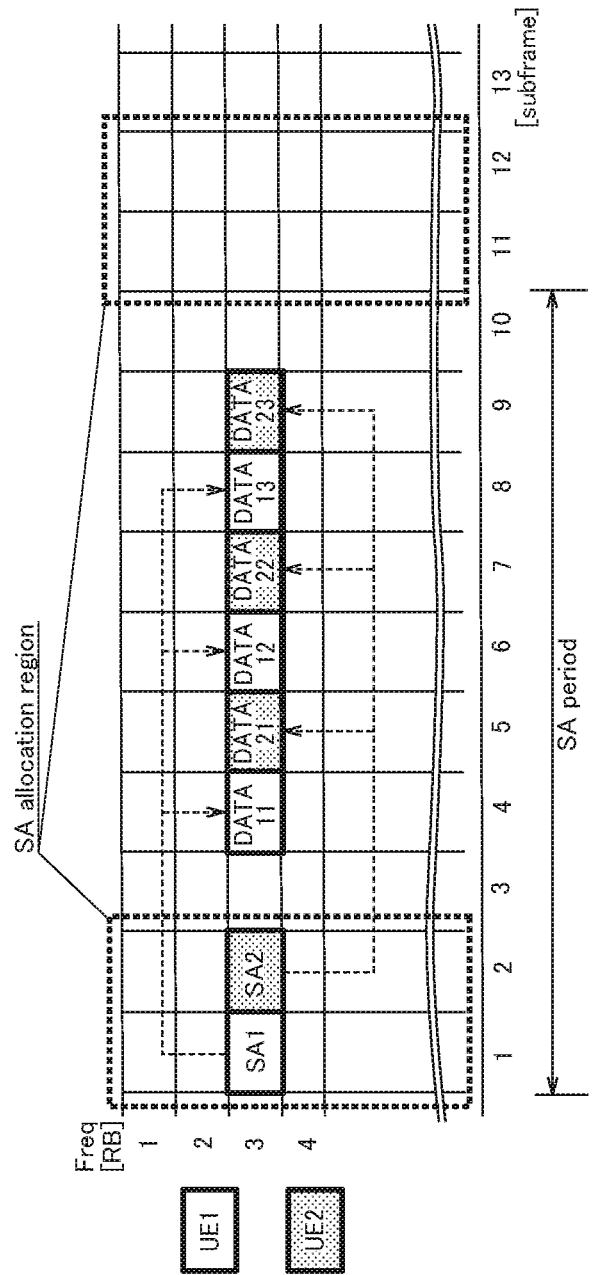
FIG. 16 is a diagram for illustrating each SA determining a location of associated data transmissions resources.

In this section a method is described to avoid data collisions. Each SA is mapped to a certain set of time-frequency resources that can be used for data transmissions. Each D2D is allowed to select a resource for its SA transmission as described in the above section. However, the same D2D UE can only transmit its data in resources that are associated with the SA resource location. In other words, the location of the SA determines the location of the data transmission resources. As shown in the FIG. 16, SA1 and SA2 points to data 11, 12, 13 and data 21, 22, 23 respectively. This method avoids collisions between data transmissions.

Proposal 2: In order to avoid data collisions SA is mapped to a certain set of time-frequency resources that can be used for data transmissions.

(3.3) Reduction in Collision of SA Transmissions

Figure 17:
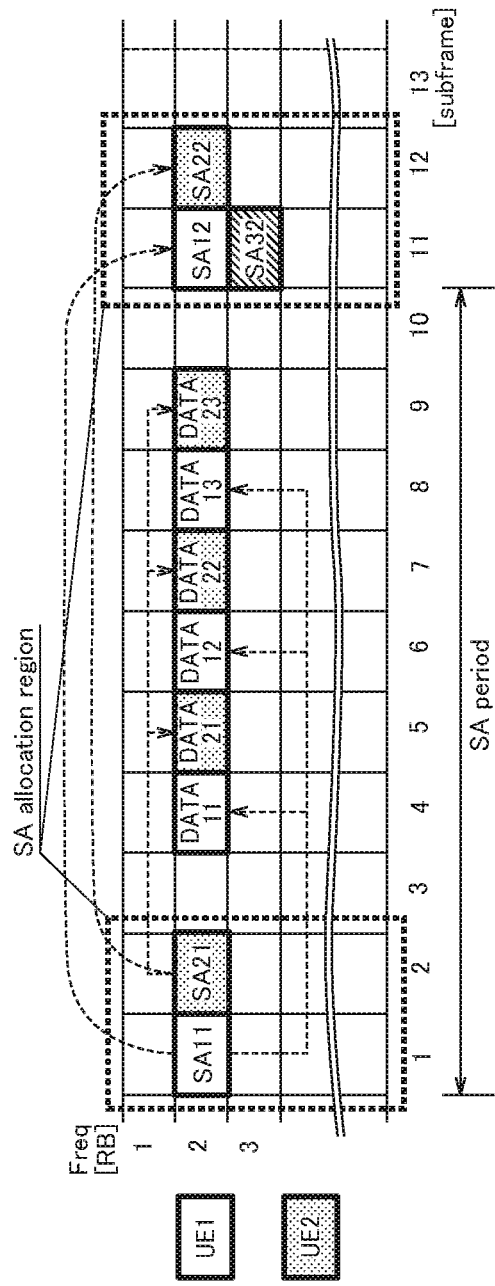
FIG. 17 is a diagram for illustrating initial SA transmission and the subsequent SA transmissions.

The above method describes the allocation of data transmissions using SA as a pointer. However, the above method is not sufficient to avoid collisions between SA transmissions. In this section we present a method to reduce SA transmission collisions. Each D2D UE monitors the SA region to detect SA transmitted by the other D2D UEs. Using this information the same D2D UE avoids transmitting its SA in the same resource used by other D2D UEs during the previous SA transmissions. For example, as shown in FIG. 17, UE1 and UE2 transmit SA11 and SA21 respectively. A third D2D UE (not shown in the figure) detects those transmissions and then transmits its SA32 at a different location. UE1 and UE2 can use the same resources used in the previous iteration for SA12 and SA22, respectively. In the initial first SA period UE1 and UE2 can randomly select resources for SA transmissions.

Proposal 3: If SA is agreed then to reduce SA collisions, D2D UE avoids transmitting its SA in the same resource used by the other D2D UEs in the previous SA transmissions.

Proposal 4: If SA is agreed, and then the resources for the initial SA transmissions are randomly selected in the SA region.

In addition, the entire content of U.S. provisional Application No. 61/934,323 (filed on Jan. 31, 2014) is incorporated in the present specification by reference.

INDUSTRIAL APPLICABILITY

As described above, the mobile communication system and the user terminal according to the present invention are able to reduce the collision of control information, and thus they are useful in a mobile communication field.

The invention claimed is:

1. A mobile communication system that supports a D2D (Device-to-Device) proximity service in which direct communication not passing through a network is enabled, comprising:
a first user terminal configured to transmit notification information for notifying presence of first D2D communication data scheduled to be directly transmitted to another user terminal, and
a second user terminal configured to hold second D2D communication data scheduled to be directly transmitted to another user terminal, wherein
the first user terminal is further configured to transmit, after transmitting the notification information, first control information indicating a location of a data resource used for transmitting the first D2D communication data,
the notification information is emergency information indicating that a content of the first D2D communication data is a content of emergency, and
if the emergency information is received, the second user terminal cancels transmission of second control information indicating a location of a data resource used for transmitting the second D2D communication data.

2. The mobile communication system according to claim 1, wherein if the content of the second D2D communication data is a content of emergency, the second user terminal transmits the second control information without canceling the transmission of the second control information even if the emergency information is received.

3. The mobile communication system according to claim 2, wherein the emergency information includes information indicating a level of emergency of the first D2D communication data, and
the second user terminal cancels the transmission of the second control information if a level of emergency of the second D2D communication data is lower than a level of emergency indicated by the information included in the emergency information.

4. The mobile communication system according to claim 1, wherein a dedicated time-frequency resource used for transmitting the emergency information is periodically provided in a time axis direction, and
the second user terminal receives the emergency information, and thereafter, if the emergency information is not received by the dedicated time-frequency resource in a next cycle, restarts the transmission of the second control information.

5. The mobile communication system according to claim 1, wherein the emergency information includes information indicating a level of emergency of the first D2D communication data, and
the second user terminal receives the first D2D communication data and preferentially displays on a user interface the first D2D communication data having a high level of emergency.

6. The mobile communication system according to claim 1, further comprising: a third user terminal configured to transmit third control information before the first user terminal, wherein
the third user terminal is further configured to select a terminal that transmits the control information next, on a basis of the notification information, and
only if the first user terminal is selected as the terminal, the first user terminal transmits the first control information.

7. The mobile communication system according to claim 6, wherein the first user terminal transmits the notification information by use of a dedicated time-frequency resource for transmitting the notification information, and
the third user terminal receives the notification information by a scan of an area in which the dedicated time-frequency resource is provided.

8. The mobile communication system according to claim 7, wherein the third user terminal transmits, together with the third control information, information for indicating a location of the dedicated time-frequency resource for transmitting the notification information.

9. The mobile communication system according to claim 6, wherein the third user terminal transmits terminal information indicating the selected terminal, by using a dedicated time-frequency resource for transmitting the terminal information, and
the first user terminal receives the terminal information by a scan of an area in which the dedicated time-frequency resource is provided.

10. The mobile communication system according to claim 9, wherein the third user terminal transmits, together with the third control information, information for designating a location of the dedicated time-frequency resource for transmitting the terminal information.

11. A first user terminal comprising:
a controller including at least a processor and at least a memory, wherein
the controller is configured to transmit notification information for notifying presence of first D2D (Device-to-Device) communication data scheduled to be transmitted, and
the controller is further configured to transmit, after transmitting the notification information, first control information indicating a location of a data resource used for transmitting the first D2D communication data, wherein the notification information is emergency information indicating that a content of the first D2D communication data is a content of emergency, and the emergency information causes a second user terminal that holds second D2D communication data scheduled to be directly transmitted to another user terminal, to cancel transmission of second control information indicating a location of a data resource used for transmitting the second D2D communication data.

12. A user terminal comprising:

a controller including at least a processor and at least a memory, wherein the controller is configured to receive, from an another terminal, notification information for notifying presence of D2D (Device-to-Device) communication data scheduled to be transmitted by the another user terminal, wherein the controller cancels transmission of control information if the notification information is emergency information, the control information indicating a location of a data resource to be used for transmitting D2D communication data, and the emergency information is information indicating that a content of the D2D communication data is a content of emergency.

* * * * *